United States Patent
Chen et al.

(10) Patent No.: US 10,235,571 B2
(45) Date of Patent: Mar. 19, 2019

(54) METHOD FOR VIDEO MATTING VIA SPARSE AND LOW-RANK REPRESENTATION

(71) Applicant: BEIHANG UNIVERSITY, Beijing (CN)

(72) Inventors: Xiaowu Chen, Beijing (CN); Dongqing Zou, Beijing (CN); Guangying Cao, Beijing (CN); Xiaogang Wang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 259 days.

(21) Appl. No.: 15/182,459

(22) Filed: Jun. 14, 2016

(65) Prior Publication Data

US 2017/0116481 A1 Apr. 27, 2017

(30) Foreign Application Priority Data

Oct. 23, 2015 (CN) .......................... 2015 1 0695505

(51) Int. Cl.
*G06K 9/00* (2006.01)
*G06K 9/34* (2006.01)
(Continued)

(52) U.S. Cl.
CPC ..... *G06K 9/00765* (2013.01); *G06K 9/00744* (2013.01); *G06K 9/4652* (2013.01);
(Continued)

(58) Field of Classification Search
CPC ........... G06K 9/00765; G06K 9/00744; G06K 9/4652; G06K 9/6244; G06K 9/6253;
(Continued)

(56) References Cited

U.S. PATENT DOCUMENTS 8,175,384 B1 * 5/2012 Wang ...................... G06T 7/194
348/586

FOREIGN PATENT DOCUMENTS

CN 102542571 A 7/2012

OTHER PUBLICATIONS

Johnson et al., "Sparse Codes as Alpha Matte", Sep. 2014, BMVA Press, Proceedings of the British Machine Vision Conference, p. 1-11.*

(Continued)

*Primary Examiner* — Vincent Rudolph
*Assistant Examiner* — Timothy Choi
(74) *Attorney, Agent, or Firm* — J.C. Patents

(57) ABSTRACT

The present invention provides a method for video matting via sparse and low-rank representation, which firstly selects frames which represent video characteristics in input video as keyframes, then trains a dictionary according to known pixels in the keyframes, next obtains a reconstruction coefficient satisfying the restriction of low-rank, sparse and non-negative according to the dictionary, and sets the non-local relationship matrix between each pixel in the input video according to the reconstruction coefficient, meanwhile sets the Laplace matrix between multiple frames, obtains a video alpha matte of the input video, according to α values of the known pixels of the input video and α values of sample points in the dictionary, the non-local relationship matrix and the Laplace matrix; and finally extracts a foreground object in the input video according to the video alpha matte, therefore improving quality of the extracted foreground object.

8 Claims, 2 Drawing Sheets

(51) Int. Cl.
G06K 9/46 (2006.01)
G06K 9/62 (2006.01)
G06T 7/194 (2017.01)
G06T 7/11 (2017.01)

(52) U.S. Cl.
CPC ......... *G06K 9/6244* (2013.01); *G06K 9/6254* (2013.01); *G06K 9/6255* (2013.01); *G06T 7/11* (2017.01); *G06T 7/194* (2017.01); *G06T 2207/10016* (2013.01); *G06T 2207/20072* (2013.01); *G06T 2207/20081* (2013.01); *G06T 2207/20104* (2013.01)

(58) Field of Classification Search
CPC ................ G06K 9/6254; G06K 9/6255; G06T 2207/20092; G06T 2207/20096; G06T 2207/20101; G06T 2207/20104; G06T 7/194; G06T 7/11; G06T 2207/10016; G06T 2207/20072; G06T 2207/20081; G06T 2210/62
See application file for complete search history.

(56) References Cited

OTHER PUBLICATIONS

Choi et al., "Video Matting Using Multi-Frame Nonlocal Matting Laplacian", Oct. 2012, Springer, European Conference on COmputer Vision, LNCS vol. 7577, p. 540-553.*
Chen et al., "Image Matting with Local and Nonlocal Smooth Priors", Jun. 2013, IEEE, Conf. on Computer Vision and Pattern Recognition, p. 1902-1907.*
Yang et al., "Fisher Discrimination Dictionary Learning for Sparse Representation", Nov. 2011, IEEE Int. Conf. on Computer Vision, p. 543-550.*
Zhao et al., "Background Subtraction via Robust Dictionary Learning", Dec. 2011, Springer, EURASIP Journal on Image and Video Processing, vol. 2011, p. 1-12.*
Guyon et al., "Foreground Detection based on Low-rank and Block-sparse Matrix Decomposition", Oct. 2012, IEEE, 2012 19th IEEE Int. Conf. on Image Processing, p. 1225-1228.*
Liu et al., "Background subtraction Based on Low-rank and Structured Sparse Decomposition", Aug. 2015, IEEE, Transaction on Image Processing, vol. 24, No. 8, 2502-2514.*
Huang et al., "Moving-object Detection based on Sparse Representation and Dictionary Learning", Aug. 2012, Elsevier, AASRI Procedia, vol. 1, p. 492-497.*
Yoon et al., "Alpha matting using compressive sensing", Feb. 2012, IET, Electronics Letters, vol. 48, iss. 3, p. 153-155.*
Bouwmans et al., "Robust PCA via Principal Component Pursuit: A review for a comparative evaluation in video surveillance", May 2014, Elsevier, Computer Vision and Image Understanding, vol. 122, p. 22-34.*
Nejati et al., "Multi-focus image fusion using dictionary-based sparse representation", Sep. 2015, Elsevier, Information Fusion, vol. 25, p. 72-84.*
David et al., "Foreground/Background Segmentation with Learned Dictionary", Dec. 2009, WSEAS, Proceedings of the 3rd Int. Conf. on Applied Mathematics, Simulation, Modeliling, Circuits, Systems, and Signals, p. 197-201.*
Mairal et al., "Non-local Sparse Models for Image Restoration", Oct. 2009, IEEE, 2009 IEEE 12th Int. Conf. on Computer Vision, 2272-2279.*
Wright et al., "Sparse Representation for Computer Vision and Pattern Recognition", Apr. 2010, IEEE, Proceedings of the IEEE, vol. 98, iss. 6, p. 1031-1044.*
Chen et al., "KNN Matting", Sep. 2013, IEEE, Transactions on Pattern Analysi and Machine Intelligence, vol. 35, No. 9, p. 2175-2188.*
Lee et al., "Nonlocal Matting", Jun. 2011, IEEE Computer Society, Conf. on Computer Vision and Pattern Recognition, p. 2193-2200.*
Chen et al., "Manifold Preserving Edit Propagation", Nov. 2012, ACM, Transactions on Graphics, vol. 31, iss. 6, p. 132:1-132:7.*
Li, Dingzeyu et al., "Motion-Aware KNN Laplacian for Video Matting" 2013 IEEE International Conference on Computer Vision; (Dec. 2013); pp. 3599-3606.
Wu, Feng, "Moving Target Detection Based on Dictionary Learning" Master Thesis Paper of the East China Jiaotong University.
The Chinese First Examination Report of corresponding Chinese patent application No. 201510695505.9, dated Jun. 30, 2017.

* cited by examiner

METHOD FOR VIDEO MATTING VIA SPARSE AND LOW-RANK REPRESENTATION

CROSS-REFERENCE TO RELATED APPLICATIONS

This application claims priority to Chinese Patent Application No. 201510695505.9, filed on Oct. 23, 2015, the content of which is hereby incorporated by reference in its entirety.

TECHNICAL FIELD

The present invention relates to image processing technologies and, in particular, relates to a method for video matting via sparse and low-rank representation.

BACKGROUND

Video matting aims at extracting moving foreground object, and ensuring a good temporal and spatial consistency. As an important technical problem in the field of computer vision technology, video matting is widely used in the fields of hair modeling, defogging, etc. In recent years, many matting methods have been proposed successively to achieve extracting high quality foreground object in complex video and image.

Since sparse representation is widely used in the fields of face recognition, image classification, image restoration and video denoising etc., Jubin et al proposed an image matting method based on the sparse representation, which reconstructs an original image with foreground pixels of a whole video and estimates opacity α (alpha) values of pixels according to a sum of coefficients corresponding to each pixel in a sparse representation coefficient matrix. The method can select appropriate sample points to reconstruct the original image automatically, however, it fails to guarantee similar α values of pixels possessing similar characteristics, therefore fails to guarantee the temporally and spatially consistency of video alpha matte. Furthermore, since only foreground pixel is used as a dictionary, the representative ability is poor, leading to a poor quality of the foreground object extracted by applying said method.

X. Chen and Q. Chen et al proposed a method of introducing non-local prior to obtain video alpha matte, which improves extraction quality by constructing non-local structure of video alpha matte. When implementing said method, a fixed number of sample points are selected directly for each pixel to reconstruct said pixel. However, selecting less sample points will lead to missing of good sample points, meanwhile selecting excessive sample points will lead to noise. Furthermore, it is difficult to construct a consistent non-local structure for pixels possessing similar characteristics, which may result in temporal and spatial inconsistency of video alpha matte, therefore the quality of a foreground object extracted by adopting said method is poor.

The above two methods, when processing video foreground object extraction, have many shortcomings which lead to that the quality of extracted background object is poor, therefore, it is necessary to propose a new solution to improve the quality of the extracted foreground object.

SUMMARY

Aiming at the above-mentioned disadvantages of the prior art, the present invention provides a method for video matting via sparse and low-rank representation, so as to improve quality of extracted foreground object.

The present invention provides a method for video matting via sparse and low-rank representation, including: determining known pixels and unknown pixels in an input video, setting opacity α values of the known pixels, and selecting frames which can represent video characteristics in the input video as keyframes; training a dictionary according to the known pixels in the keyframes, and setting α values of sample points in the dictionary; obtaining a reconstruction coefficient of the input video corresponding to the dictionary according to the dictionary, and setting a non-local relationship matrix between each pixel in the input video according to the reconstruction coefficient; setting a Laplace matrix between multiple frames; obtaining a video alpha matte of the input video, according to the α values of the known pixels of the input video and the α values of sample points in the dictionary, the non-local relationship matrix and the Laplace matrix; and extracting a foreground object in the input video according to the video alpha matte.

In an embodiment of the present invention, the determining the known pixels and the unknown pixels in the input video, specifically including:
determining the known pixels and the unknown pixels in the input video by using a pen-based interaction marking; or determining the known pixels and the unknown pixels in the input video according to a trimap of the input video.

In an embodiment of the present invention, the setting the opacity α values of the known pixels, specifically including:
setting α values of known foreground pixels as 1, and setting α values of known background pixels as 0.

In an embodiment of the present invention, the training the dictionary according to the known pixels in the keyframes, specifically including:
training the dictionary by minimizing following energy equation (1):

$$\underset{(D,Z)}{\operatorname{argmin}} \sum_{i,j} \left( \|\hat{X} - DZ\|_F^2 + \|\hat{X}_i - D_i Z_i\|_F^2 + \sum_{j \neq i} \|D_j Z_i^j\|_F^2 \right) \quad (1)$$

wherein, $\hat{X} = \{\hat{X}_f, \hat{X}_b\}$ represents the known pixels in the keyframes; $\hat{X}_f$ and $\hat{X}_b$ represent the known foreground pixels and background pixels in the keyframes respectively; $D = \{D_f, D_b\}$ represents the trained dictionary, $D_f$ and $D_b$ represent the foreground dictionary and the background dictionary respectively; $Z_f = \{Z_f^f, Z_f^b\}$ represents a reconstruction coefficient of the foreground pixel $\hat{X}_f$ corresponding to the dictionary D, $Z_b = \{Z_b^f, Z_b^b\}$ represents a reconstruction coefficient of the background pixel $\hat{X}_b$ corresponding to the dictionary D, and $\{Z_i^j | i,j = f,b\}$ represents a reconstruction coefficient of a known point $\hat{X}_i$ corresponding to the dictionary $D_j$.

In an embodiment of the present invention, the obtaining the reconstruction coefficient of the input video corresponding to the dictionary according to the dictionary, specifically including:
obtaining the reconstruction coefficient of the input video corresponding to the dictionary by minimizing following energy equation (2):

$$\min \sum_i^n (\|X_i - DW_i\|_0 + \|W_i\|_0) + \|W\|_* \quad (2)$$

$$\forall\, p,\, q,\, (w_i)_{p,q} \in W_i,\, \text{s.t.} (w_i)_{p,q} >= 0.$$

wherein, $X = \{X_1, \ldots, X_n\}$, n represents that there are n frames in the input video, $X_i$ represents RGBXY characteristics of the $i^{th}$ frame, $\|\cdot\|_*$ represents a nuclear norm, which is the sum of singular values of the matrix and is used for restraining the reconstruction coefficient being low-rank, $\|\cdot\|_0$ represents a zero norm, which is the number of nonzero elements and is used for restraining the reconstruction coefficient being sparse, $$W = \{W_1, \ldots, W_n\} = \begin{vmatrix} (w_1)_{1,1} & \cdots & (w_i)_{1,p} & \cdots & (w_n)_{1,m} \\ \vdots & \ddots & \vdots & & \vdots \\ (w_1)_{q,1} & \cdots & (w_i)_{q,p} & \cdots & (w_n)_{q,m} \\ \vdots & & \vdots & \ddots & \vdots \\ (w_1)_{t,1} & \cdots & (w_i)_{t,p} & \cdots & (w_n)_{t,m} \end{vmatrix},$$

m represents that the number of pixel in each frame is m, t represents that the number of sample points in the dictionary D is t, $(w_i)_{q,p}$ represents the reconstruction coefficient of the $p^{th}$ pixel in the $i^{th}$ frame corresponding to the $q^{th}$ sample point in the dictionary.

In an embodiment of the present invention, the setting the non-local relationship matrix between each pixel in the input video according to the reconstruction coefficient, specifically including:

setting the non-local relationship matrix according formula (3):

$$\min \sum_i^n \sum_j^m (\alpha_{ij} - \alpha_D w_{ij})^2 \quad (3)$$

wherein, $\alpha_{ij}$ represents the $\alpha$ value of the $j^{th}$ pixel in $i^{th}$ frame, m represents the number of pixels in each frame is m, $\alpha_D = \{\alpha_f, \alpha_b\}$ represents $\alpha$ values of all sample points in the dictionary D, $\alpha_f=1$ represents $\alpha$ values of sample points in the foreground dictionary, $\alpha_b=0$ represents $\alpha$ values of sample points in the background dictionary, $w_{ij} = [(w_i)_{1,j}, \ldots, (w_i)_{t,j}]$ represents the reconstruction coefficient of the $j^{th}$ pixel in the $i^{th}$ frame corresponding to the dictionary D.

In an embodiment of the present invention, the setting Laplace matrix between multiple frames, specifically including:

setting a Laplace matrix between multiple frames according formula (4):

$$W_{ij}^{mlap} = \delta \sum_k^{(i,j) \in c_k} \frac{1 + (C_i - \mu_k)\left(\Sigma_k + \frac{\delta}{d \times m^2} I\right)^{-1}(C_j - \mu_k)}{d \times m^2}. \quad (4)$$

wherein, $W_{ij}^{mlap}$ represents a Laplace matrix, $\delta$ controls a intensity of local smoothness, k represents the number of the windows in one frame, $c_k$ represents the $k^{th}$ window, $C_i$ represents a color value of the $i^{th}$ pixel, $\mu_k$ and $\Sigma_k$ represent mean and variance of the color in the window respectively, ò represents a normal coefficient, $d \times m^2$ is a size of the window which represents selecting neighboring d frames and each frame selects pixels in $m^2$ window as neighbors, and I represents an identity matrix.

In an embodiment of the present invention, set the normal coefficient ò as $10^{-5}$, set m as 3, and set d as 2.

In an embodiment of the present invention, the obtaining the video alpha matte of the input video, according to $\alpha$ values of the known pixels of the input video and $\alpha$ values of sample points in the dictionary, the non-local relationship matrix and the Laplace matrix, specifically including:

obtaining $\alpha$ values of the unknown pixels of the input video according formula (5):

$$E = \lambda \sum_{s \in S} (\alpha_s - g_s)^2 + \quad (5)$$

$$\sum_{i=1}^n \sum_{j=1}^m (\alpha_{ij} - \alpha_D w_{ij})^2 + \sum_{i=1}^n \sum_{j=1}^m \left(\Sigma_{(k \in N_j)} W_{jt}^{mlap}(\alpha_{ij} - \alpha_k)\right)^2$$

wherein, S represents a set constructed by $\alpha$ values of the known pixels of the input video and $\alpha$ values of sample points in the dictionary, $N_j$ is adjacent points of pixel j in $d \times m^2$ window, $g_s=1$ represents pixel s in set S is a foreground pixel, and $g_s=0$ represents pixel s in set S is a background pixel; and obtaining the video alpha matte of the input video according to $\alpha$ values of the known pixels and $\alpha$ values of the unknown pixels of the input video.

The method for video matting via sparse and low-rank representation provided by the present embodiment, trains the dictionary with strong representing ability according to the known foreground pixels and background pixels in the selected keyframes, then obtains a reconstruction coefficient which satisfies the restriction of low-rank, sparse and non-negative according to the dictionary, sets the non-local relationship matrix between each pixel in the input video according to the reconstruction coefficient, meanwhile sets the Laplace matrix between multiple frames, therefore guarantees the temporal and spatial consistency and local smoothness of obtained video alpha matte of the input video. Furthermore, the quality of foreground object extracted according the video alpha matte is improved effectively.

DESCRIPTION OF EMBODIMENTS

In order to illustrate the objects, technical solutions and advantages of the present invention more clearly, embodiments of the present invention are described in further details with reference to the accompanying drawings. Obviously, the embodiments described are only some exemplary embodiments of the present invention, not all embodiments. Other embodiments derived by those skilled in the art on the basis of the embodiments herein without any creative effort fall within the protection scope of the present invention.

Figure 1:
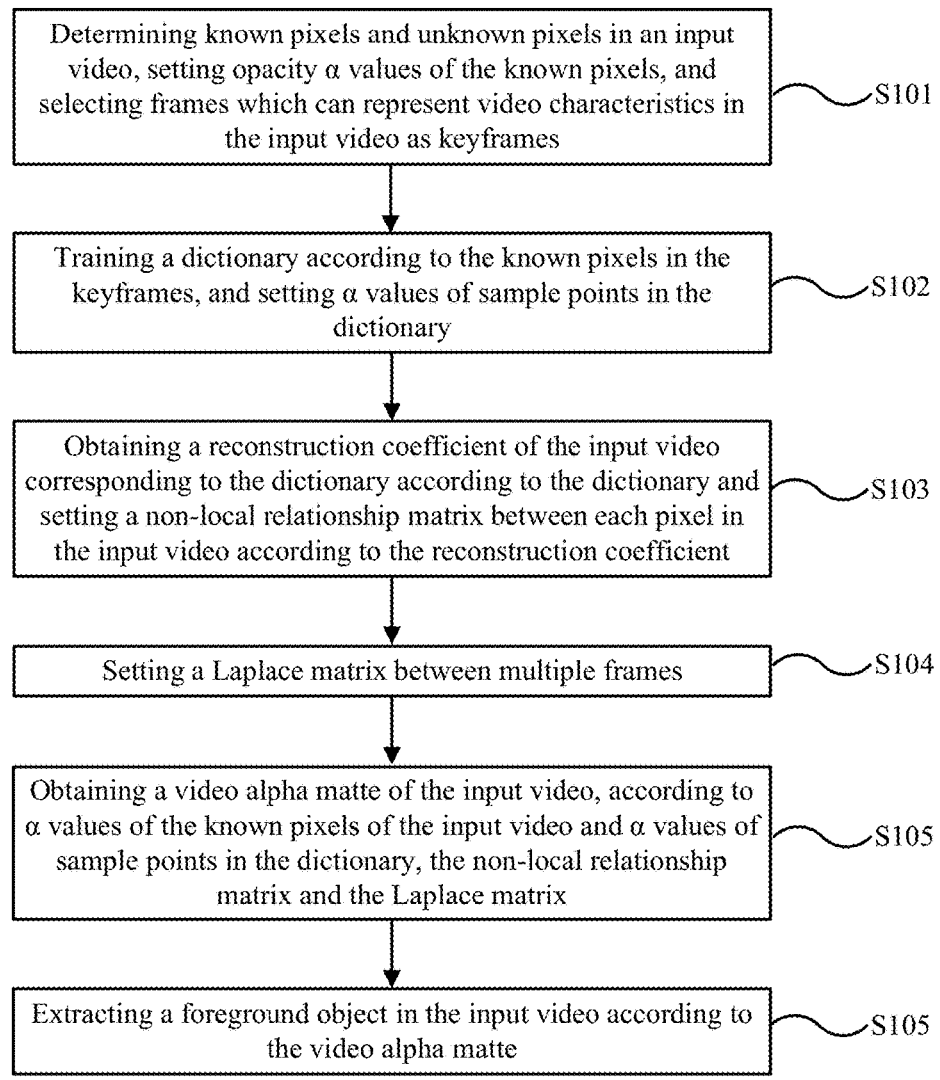
FIG. 1 is a flow chart of a method for video matting via sparse and low-rank representation according to a first embodiment of the present invention.

FIG. 1 is a flow chart of a method for video matting via sparse and low-rank representation according to a first embodiment of the present invention. An executive entity of the method can be a computer or other processing devices. As shown in FIG. 1, the method provided by the present embodiment includes:

S101, Determining known pixels and unknown pixels in an input video, setting opacity α values of the known pixels, and selecting frames which can represent video characteristics in the input video as keyframes.

Particularly, the known pixels include foreground pixels and background pixels, wherein, the foreground pixels are pixels in an area where a content of an image needs to be extracted and the background pixels are pixels in an area where a content of an image does not need to be extracted. The known pixels are pixels which can be clearly identified as belonging to the foreground pixels or the background pixels according to the input video, and the unknown pixels are pixels in an area where a foreground image and a background image overlap which are indistinguishable.

When determining the known pixels and the unknown pixels, pen-based interaction marking can be applied to determine the known pixels and the unknown pixels in the input video. For example, a pen is applied to mark the foreground pixels and the background pixels in a video image, wherein, pixels covered by a white colored pen are known foreground pixels, pixels covered by a black colored pen are known background pixels, and other pixels without being marked by a pen are the unknown pixels.

Alternatively, it is also possible to determine the known pixels and the unknown pixels in the video according to a trimap of the input video. Specifically, a black-white-gray trimap of a same size with the input video can be provided, wherein, pixels corresponding to a white area are the known foreground pixels, pixels corresponding to a black area are the known background pixels, and pixels corresponding to a gray area are the unknown pixels.

It should be noted that, when determining the known pixels and the unknown pixels in the input video, the above method can be adopted to process the whole input video according to an actual situation, or process a part of the input video, and all pixels in other video image without determining the known pixels are determined as the unknown pixels.

After determining the known pixels in the input video, opacity α values of the known pixels can be set, wherein, set opacity α values of the foreground pixels which need to be extracted as larger values and set opacity α values of the background pixels which do not need to be extracted as smaller values. Preferably, in the present embodiment, set the opacity α values of the known foreground pixels as the maximum value 1 and set the opacity α values of the known background pixels as the minimum value 0.

Moreover, since the data amount of the entire input video is large, in the present embodiment, select frames which can represent the video characteristics in the input video as the keyframes to train the dictionary, so as to reduce calculating amount. When selecting the keyframes, it is possible to select one frame image per several frame images and take the selected frame images as the keyframes, or it is possible to select more frame images in video segment with large variation and select less frame images in video segment with small variation, which can be selected arbitrarily according to specific circumstances, as long as the video characteristics can be represented.

S102, Training a dictionary according to the known pixels in the keyframes, and setting α values of sample points in the dictionary.

After obtaining the keyframes, the dictionary can be trained according to the known pixels in the keyframes directly. The dictionary includes a foreground dictionary and a background dictionary, a characteristic space of which is a five dimensional characteristic space including RGBXY characteristic values included therein, wherein RGB is RGB color value of the pixels and XY is coordinate position of the pixels in the image. The training process of the dictionary can be transformed to minimizing the following energy equation:

$$\underset{(D,Z)}{\operatorname{argmin}} \sum_{i,j} \left( \|\hat{X} - DZ\|_F^2 + \|\hat{X}_i - D_i Z_i\|_F^2 + \sum_{j \neq i} \|D_j Z_i^j\|_F^2 \right) \quad (1)$$

Wherein, $\hat{X}=\{\hat{X}_f, \hat{X}_b\}$ represents the known pixels in the keyframes; $\hat{X}_f$ and $\hat{X}_b$ represent the known foreground pixels and background pixels in the keyframes, respectively; $D=\{D_f, D_b\}$ represents the trained dictionary, $D_f$ and $D_b$ represent the foreground dictionary and the background dictionary, respectively; $Z_f=\{Z_f^f, Z_f^b\}$ represents a reconstruction coefficient of the foreground pixel of $\hat{X}_f$ corresponding to the dictionary D, $Z_b=\{Z_b^f, Z_b^b\}$ represents a reconstruction coefficient of the background pixel of $\hat{X}_b$ corresponding to the dictionary D, and $\{Z_i^j | i,j=f,b\}$ represents a reconstruction coefficient of a known point $\hat{X}_i$ corresponding to the dictionary $D_j$.

In the above formula (1), the first term $\|X-DZ\|_F^2$ represents that the dictionary can reconstruct all known pixels, so as to guarantee a strong representative ability of the dictionary; the second term $\|X_i-D_i Z_i\|_F^2$ represents that dictionary $D_i$ can reconstruct the known pixel $X_i$, namely the foreground pixels can be reconstructed by the foreground dictionary and the background pixels can be reconstructed by the background dictionary; the third term $$\sum_{j \neq i} \|D_j Z_i^j\|_F^2$$

restrains that the reconstruction coefficient $Z_i^j$ of the known pixel $X_i$ corresponding to the dictionary $D_i$ is closing to 0, namely the foreground points may response to the foreground dictionary but may almost not response to the background dictionary, and the background points may response to the background dictionary but may almost not response to the background dictionary, that is to say, the foreground points are reconstructed by the foreground dictionary but cannot be reconstructed by the background dictionary, and the background points are reconstructed by the background dictionary but cannot be reconstructed by the foreground dictionary.

Regarding to α value of each sample point in the dictionary, α values of sample points in the foreground dictionary may be set as 1, and the α values of sample points in the background dictionary may be set as 0.

S103, Obtaining a reconstruction coefficient of the input video corresponding to the dictionary according to the dictionary and setting a non-local relationship matrix between each pixel in the input video according to the reconstruction coefficient.

Since the pixels of the same object described in different frames come from an identical characteristic subspace, each pixel can be expressed by the elements in the characteristic subspace through linear combination, therefore the entire video can be reconstructed by dictionary with a representation matrix (namely the following reconstruction coefficient matrix) of low-rank and sparse. Regarding the entire video, each pixel corresponding to dictionary D has one reconstruction coefficient. The reconstruction coefficient of the entire input video can be expressed as:

$$W = \{W_1, \ldots, W_n\} = \begin{vmatrix} (w_1)_{1,1} & \cdots & (w_i)_{1,p} & \cdots & (w_n)_{1,m} \\ \vdots & \ddots & \vdots & & \vdots \\ (w_1)_{q,1} & \cdots & (w_i)_{q,p} & \cdots & (w_n)_{q,m} \\ \vdots & & \vdots & \ddots & \vdots \\ (w_1)_{t,1} & \cdots & (w_i)_{t,p} & \cdots & (w_n)_{t,m} \end{vmatrix}$$

The solving process of the reconstruction coefficient of the entire video can be ascribed to minimizing the following energy equation:

$$\min \sum_i^n (\|X_i - DW_i\|_0 + \|W_i\|_0) + \|W\|_* \quad (2)$$

$$\forall\, p, q,\ (w_i)_{p,q} \in W_i,\ \text{s.t.}(w_i)_{p,q} >= 0.$$

Wherein, $X = \{X_1, \ldots, X_n\}$, n represents that there are n frames in the input video, $X_i$ represents the RGBXY characteristics of the $i^{th}$ frame, $\|\cdot\|_*$ represents a nuclear norm, which is the sum of singular values of the matrix and is used for restraining the reconstruction coefficient being low-rank, $\|\cdot\|_0$ represents a zero norm, which is the number of nonzero elements and is used for restraining the reconstruction coefficient being sparse, m represents that the number of pixels in each frame is m, t represents that the number of sample points in the dictionary D is t, $(w_i)_{q,p}$ represents the reconstruction coefficient of the $p^{th}$ pixel in the $i^{th}$ frame corresponding to the $q^{th}$ sample point in the dictionary.

In the above formula (2), the restriction of sparse may guarantee that each pixel in the video can be reconstructed by several elements in the dictionary, and the restriction of low-rank may guarantee the temporal and spatial consistency of video alpha matte. Specifically, the restriction of low-rank may guarantee that pixels possessing similar characteristic in one frame can be reconstructed by the same elements in the dictionary, therefore guarantee consistency of video alpha matte in spatial domain; the restriction of low-rank may also guarantee pixels possessing similar characteristic in continuous video can also be reconstructed by the same elements in the dictionary, therefore guarantee the temporal and spatial consistency of video alpha matte. Preferably, low-rank requires the rank of W is far less than the number of its rows and the number of its columns, and sparse requires the number of 0 in W is more than 50% thereof.

After solving the reconstruction coefficient of the input video, a non-local relationship matrix can be set between each pixel in the input video according to the reconstruction coefficient:

$$\min \sum_i^n \sum_j^m (\alpha_{ij} - \alpha_D w_{ij})^2 \quad (3)$$

Wherein, $\alpha_{ij}$ represents the $\alpha$ value of the $j^{th}$ pixel in $i^{th}$ frame, m represents the number of pixels in each frame is m, $\alpha_D = \{\alpha_f, \alpha_b\}$ represents $\alpha$ values of all sample points in the dictionary D, $\alpha_f = 1$ represents $\alpha$ values of sample points in the foreground dictionary, $\alpha_b = 0$ represents $\alpha$ values of sample points in the background dictionary, $w_{ij} = [(w_i)_{1,j}, \ldots, (w_i)_{t,j}]$ represents the reconstruction coefficient of the $j^{th}$ pixel in the $i^{th}$ frame corresponding to the dictionary D.

The above solved reconstruction coefficient satisfies the restriction of low-rank and sparse, therefore the non-local relationship matrix reconstructed according to the reconstruction coefficient may guarantee the temporal and spatial consistency of video alpha matte in non-local relationship.

S104, Setting a Laplace matrix between multiple frames.

When setting the non-local relationship, a Laplace matrix between frames may also be set at the same time so as to guarantee the temporal and spatial consistency of video alpha matte in local relationship. Particularly, the Laplace matrix $W_{ij}^{mlap}$ can be set between multiple frames according to formula (4):

$$W_{ij}^{mlap} = \delta \sum_k^{(i,j) \in c_k} \frac{1 + (C_i - \mu_k)\left(\Sigma_k + \frac{\grave{o}}{d \times \mu^2} I\right)^{-1}(C_j - \mu_k)}{d \times m^2}. \quad (4)$$

Wherein, $\delta$ controls intensity of local smoothness, k represents the number of the windows in one frame, $c_k$ represents the $k^{th}$ window, $C_i$ represents a color value of the $i^{th}$ pixel, $\mu_k$ and $\Sigma_k$ represent mean and variance of the color in the window respectively, $\grave{o}$ represents a normal coefficient, $d \times m^2$ is a size of the window which represents selecting neighboring d frames and each frame selects pixels in $m^2$ window as neighbors, and I represents an identity matrix.

Extending the above Laplace matrix from single frame image to multi-frame image, besides pixels in neighboring windows in the present frame, pixels in neighboring windows in neighboring video frame are also considered, neighbors are constituted by these pixels to construct a color line model of the point, therefore not only the local smoothness of the video alpha matte can be enhanced, the temporal and spatial consistency of video alpha matte of neighboring frames can also be enhanced.

Figure 2:
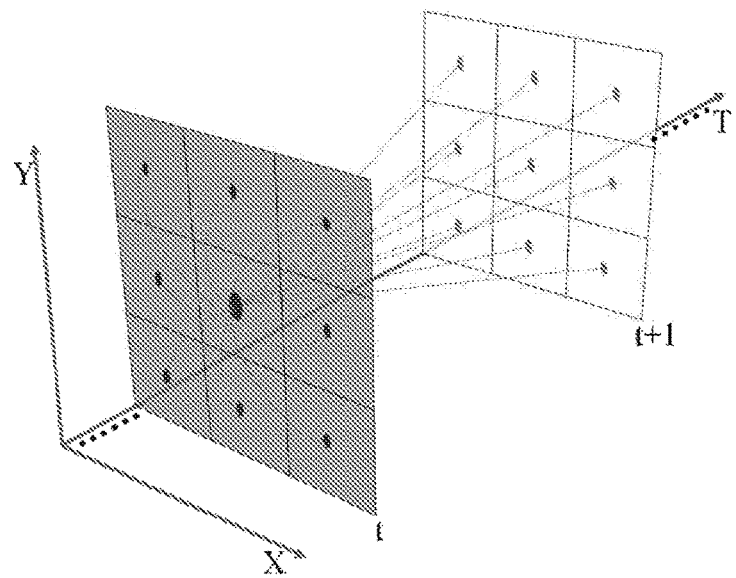
FIG. 2 is a construction diagram of a Laplace matrix between multiple frames in the present invention.

Preferably, in the above equation (4), set the normal coefficient $\grave{o}$ as $10^{-5}$, set m as 3, and set d as 2. FIG. 2 is a construction diagram of Laplace matrix between multiple frames in the present invention. As shown in FIG. 2, the figure illustrates a method of constructing two frames Laplace matrix. Regarding the present frame j, besides the pixels in 3×3 window in present frame, the pixels in 3×3 window in neighboring frames are also considered, the two parts of pixels construct the neighbors of the pixel j, and then construct the Laplace matrix.

It should be noted that there is no strict timing relationship between step S103 and step S104, step S104 may be performed before step S103 and may also be performed simultaneously with the step S103.

S105, Obtaining a video alpha matte of the input video, according to $\alpha$ values of the known pixels of the input video and $\alpha$ values of sample points in the dictionary, the non-local relationship matrix and the Laplace matrix.

According to the $\alpha$ values of all known pixels determined in S101, the $\alpha$ value of each sample point in the trained dictionary determined in S102, the non-local relationship matrix constructed in S103 and the Laplace matrix constructed in S104, an energy equation of all pixels in continuous multiple frames can be constructed so as to obtain a probability (i.e., $\alpha$ value) of each pixel belonging to foreground, therefore the video alpha matte is obtained.

Particularly, the energy equation may be constructed according to formula (5):

$$E = \lambda \sum_{s \in S} (\alpha_s - g_s)^2 + \sum_{i=1}^{n} \sum_{j=1}^{m} (\alpha_{ij} - \alpha_D w_{ij})^2 + \quad (5)$$

$$\sum_{i=1}^{n} \sum_{j=1}^{m} \left( \sum_{(k \in N_i)} W_{jt}^{mlap} (\alpha_{ij} - \alpha_k) \right)^2$$

Wherein, S represents a set constructed by α values of the known pixels of the input video and α values of sample points in the dictionary, $N_j$ is adjacent points of pixel j in $d \times m^2$ window, $g_s=1$ represents pixel s in set S is a foreground pixel, and $g_s=0$ represents pixel s in set S is a background pixel.

After obtaining the α values of the unknown pixels in the input video according to the above formula (5), then combine with the α values of the known pixels in the input video, the video alpha matte of the input video can be obtained.

The solving of the above formula (5) can be realized by following way:

The above energy equation E can be expressed in a matrix form as:

$$E=(\alpha-G)^T \Lambda (\alpha-G)+\alpha^T L \alpha \quad (6)$$

Wherein, Λ is a diagonal matrix, if the pixel s belonging to the set S then set $\Lambda_{ss}$ as a extremely large constant, such as 200, otherwise set to 0, G is a vector, a value of which determines α values in step S102, if the pixel s belonging to the known foreground pixels then set $G_s$ to 1, otherwise set to 0, $$L = \begin{bmatrix} L_D & -W \\ -W^T & L_u \end{bmatrix},$$

wherein W is a reconstruction coefficient matrix of the input video corresponding to the dictionary D, $L_D=W*W^T$, diagonal line $L_u$ is a multi-frame Laplace matrix of each frame, that is $L_u=\text{diag}(W_1^{mlap}; \ldots; W_n^{mlap})$. The matrix form expression (6) of the above energy equation is a quadratic equation concerning α, and the α values can be minimized by resolving the following linear equation:

$$(\Lambda+L)\alpha=\Lambda G \quad (7)$$

The above equation is a sparse linear equation set, a global optimum closed-form solution can be obtained by preprocessing a conjugate gradient method.

S106, Extracting a foreground object in the input video according to the video alpha matte.

Regarding the input video X, each pixel $X_i$ of which is a linear combination of color $F_i$ of the foreground image and color $B_i$ of the background image, that is, $X_i=F_i \times \alpha_i+B_i \times (1-\alpha_i)$, therefore multiply α value of each pixel in the obtained video alpha matte with the each pixel in the input video, namely the foreground object of the input video can be extracted, which particularly can be expressed by formula as:

$$C=X \times \alpha \quad (7)$$

Wherein, C represents the extracted foreground object of the input video, X represents the input video, α represents α value of each pixel in video alpha matte corresponding to the input video.

Existing image matting method based on sparse representation only uses foreground pixels to reconstruct original image, which fails to guarantee the temporal and spatial consistency, since only foreground pixels are used as the dictionary, the representative ability is poor, leading to that the quality of the foreground object extracted by applying said method is poor. Comparing to said method, in the present embodiment, that pixels with similar characteristic possess similar α values is guaranteed by the restriction of low-rank and the Laplace matrix between multiple frames, therefore the temporal and spatial consistency of video alpha matte is guaranteed. Furthermore, the known pixels used for training the dictionary include the background pixels and the foreground pixels, the constructed foreground dictionary and background dictionary possessing strong discriminative ability, and strong representative ability, therefore improving the quality of extracted foreground object effectively. In addition, in the present embodiment, only the pixels in the keyframes are used to train the dictionary, the calculation load is small. In existing obtaining video alpha matte method by introducing non-local prior method, fixed number of sample points are selected to reconstruct original image. It is difficult to construct a consistent non-local structure for pixels possessing similar characteristics which may result in temporal and spatial inconsistent video alpha matte, therefore the quality of a foreground object extracted by adopting said method is poor. However, in the method provided by the present embodiment, firstly foreground dictionary and background dictionary are constructed according to the known pixels, then sample points in the dictionary are selected automatically while solving reconstruction coefficient by the restriction of low-rank, which guarantees that pixels with similar characteristic possessing similar α values by the restriction of low-rank and the Laplace matrix between multiple frames, therefore guarantees the temporal and spatial consistency of video alpha matte. Furthermore, the quality of extracted foreground object is improved effectively.

The method provided by the present embodiment, after many experiments, possesses obvious advantages when dealing with the problem of blur left behind by a fast-moving object, edge of semitransparent object and different translucencies, and object with large topology variation, which may be widely applied to video program production and other image processing fields.

The method for video matting via sparse and low-rank representation provided by the present embodiment, a dictionary with strong representative and discriminative ability is trained according to the known foreground pixels and background pixels in the selected keyframes, then reconstruction coefficient is obtained which satisfies the restriction of low-rank, sparse and non-negative according to the dictionary, the non-local relationship matrix between each pixel is set in the input video according to the reconstruction coefficient, meanwhile the Laplace matrix between multiple frames is set, therefore guarantees the temporal and spatial consistency of video alpha matte and local smoothness of the obtained input video. Furthermore, the quality of foreground object extracted according the video alpha matte is improved effectively.

Figure 3:
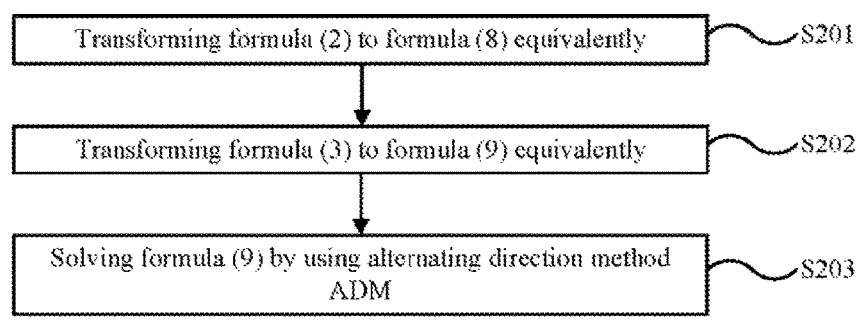
FIG. 3 is a flow chart of a method for video matting via sparse and low-rank representation according to a second embodiment of the present invention.

FIG. 3 is a flow chart of a method for video matting via sparse and low-rank representation according to a second embodiment of the present invention. The present embodiment mainly illustrates a detailed step of obtaining reconstruction coefficient of the input video corresponding to the dictionary in the above step S103. On the basis of the above embodiment, as shown in FIG. 3, in the present embodiment, the obtaining the reconstruction coefficient of the input video corresponding to the dictionary according to the dictionary in step S103, specifically includes:

S201, Transforming formula (2) to formula (8) equivalently:

$$\min \sum_i^n (\|W_i\|_1 + \lambda \|E_i\|_1) + \gamma \|W\|_* \quad (8)$$

s.t.

$X_i = D_i S_i + E_i;$ $W_i = J_i;$ $W_i = S_i;$ $W_i = T_i,$ $T_i >= 0.$

Wherein, $X_i$ represents the RGBXY characteristics of the $i^{th}$ frame, $\lambda$ and $\gamma$ represent equilibrium coefficients, and $S_1, K, S_n, K, J_1, K, J_n, K, T_1, K, T_n$ is an auxiliary variable.

S202, Transforming formula (3) to formula (9) equivalently:

$$\min \left( \gamma \|W\|_* + \sum_i^n (\|J_i\|_1 + \lambda \|E_i\|_1) + \sum_i^n (\langle A_i, W_i - J_i \rangle + \langle Y_i, X_i - D_i S_i - E_i \rangle + \langle V_i, W_i - S_i \rangle + \langle U_i, W_i - T_i \rangle + \frac{\mu}{2} \|X_i - D_i S_i - E_i\|_F^2 + \frac{\mu}{2} \|W_i - J_i\|_F^2 + \frac{\mu}{2} \|W_i - S_i\|_F^2 + \frac{\mu}{2} \|W_i - T_i\|_F^2) \right) \quad (9)$$

Wherein, $E_i$ is a reconstruction error for the $i^{th}$ frame, $A_1, K, A_n, K, Y_1, K, Y_n, K, V_1, K, V_n, U_1, K, U_n$ is a Lagrangian multiplier.

S203, Solving formula (9) by using an alternating direction method (alternating direction method, ADM).

The ADM algorithm is namely an inexact augmented Lagrange multiplier Method (inexact Augmented Lagrange Multiplier Method, inexact ALM), which mainly uses an iterative solution method, and input variables includes video X with n frames, dictionary D, and equilibrium coefficients $\lambda$ and $\gamma$. Specific steps are as follows:

First, initializing $A=U=V=Y=0, S=T=J=0, \mu=10^{-6}$, and then start the iterative process:

1, Fixing other variables, and updating $J_i$. The specific formula is:

$$J_i = \underset{J_i}{\operatorname{argmin}} \frac{1}{\mu} \|J_i\|_1 + \frac{1}{2} \left\| J_i - \left( W_i + \frac{A_i}{\mu} \right) \right\|_F^2.$$

2, Fixing other variables, and updating $S_i$. The specific formula is:

$$S_i = (D^T D + I)^{-1} \left( D^T (X_i - E_i) + W_i + \frac{(D^T Y_i + V_i)}{\mu} \right).$$

3, Fixing other variables, and updating $T_i$. The specific formula is:

$$T_i = W_i + \frac{U_i}{\mu},$$

$$T_i = \max(T_i, 0).$$

4, Fixing other variables, and updating W. The specific formula is:

$$W_i = \underset{W}{\operatorname{argmin}} \frac{\gamma}{2\mu} \|W\|_* + \frac{1}{2} \|W - M\|_F^2.$$

Wherein, $M = [F_1, F_2, K, F_n],$ and $$F_i = \frac{1}{3} \left( J_i + S_i + T_i = \frac{(A_i + V_i + U_i)}{\mu} \right).$$

5, Fixing other variables, and updating $E_i$. The specific formula is:

$$E_i = \underset{E_i}{\operatorname{argmin}} \frac{\lambda}{\mu} \|E_i\|_1 + \frac{1}{2} \left\| E_i - \left( X_i - DS_i + \frac{Y_i}{\mu} \right) \right\|_F^2.$$

6, Updating each Lagrangian multiplier $A_i, Y_i, V_i$. The specific formula is:

$A_i = A_i + \mu(W_i - J_i), Y_i = Y_i + \mu(X_i - DS_i - E_i),$ $V_i = V_i + \mu(W_i - S_i), U_i = U_i + \mu(W_i - T_i).$

7, Updating $\mu$. The specific formula is:

$\mu = \min(1.1\mu, 10^{10}). \ (\rho=1.9).$

8, Check whether a condition of convergence is achieved, i.e., $X_i - DS_i - E_i \to 0, W_i - J_i \to 0, W_i - S_i \to 0$ and $W_i - T_i \to 0$. If it does not converge, continue iteration until it converges or reaches the maximum number of iteration.

Finally, it should be noted that the above embodiments are merely provided for describing the technical solutions of the present invention, but not intended to limit the present invention. It should be understood by persons skilled in the art that although the present invention has been described in detail with reference to the foregoing embodiments, modifications can be made to the technical solutions described in the foregoing embodiments, or equivalent replacements can be made to partial or all technical features in the technical solutions; however, such modifications or replacements do not cause the essence of corresponding technical solutions to depart from the scope of the embodiments of the present invention.

What is claimed is:

1. A method for video matting via sparse and low-rank representation, comprising:

determining known pixels and unknown pixels in an input video, setting opacity $\alpha$ values of the known pixels, and selecting frames which can represent video characteristics in the input video as keyframes;

training a dictionary according to the known pixels in the keyframes, and setting $\alpha$ values of sample points in the dictionary;

obtaining a reconstruction coefficient of the input video corresponding to the dictionary according to the dictionary, and setting a non-local relationship matrix between each pixel in the input video according to the reconstruction coefficient;

setting a Laplace matrix between multiple frames;

obtaining a video alpha matte of the input video, according to the α values of the known pixels of the input video and the α values of the sample points in the dictionary, the non-local relationship matrix and the Laplace matrix; and extracting a foreground object in the input video according to the video alpha matte;

wherein, the obtaining the reconstruction coefficient of the input video corresponding to the dictionary according to the dictionary, specifically comprises:

obtaining the reconstruction coefficient of the input video corresponding to the dictionary by minimizing following energy equation (2):

$$\min \sum_i^n (\|X_i - DW_i\|_0 + \|W_i\|_0) + \|W\|_* \,\forall\, p, q, (w_i)_{p,q} \in W_i, \quad (2)$$

s.t.

$$(w_i)_{p,q} >= 0.$$

wherein, $X=\{X_1, \ldots, X_n\}$, n represents that there are n frames in the input video, $X_i$ represents RGBXY characteristics of the $i^{th}$ frame, $\|\bullet\|_*$ represents a nuclear norm, which is the sum of singular values of the matrix and is used for restraining the reconstruction coefficient being low-rank, $\|\bullet\|_0$ represents a zero norm, which is a number of nonzero elements and is used for restraining the reconstruction coefficient being sparse, $$W = \{W_1, \ldots, W_n\} = \begin{vmatrix} (w_1)_{1,1} & \cdots & (w_i)_{1,p} & \cdots & (w_n)_{1,m} \\ \vdots & \ddots & \vdots & & \vdots \\ (w_1)_{q,1} & \cdots & (w_i)_{q,p} & \cdots & (w_n)_{q,m} \\ \vdots & & \vdots & \ddots & \vdots \\ (w_1)_{t,1} & \cdots & (w_i)_{t,p} & \cdots & (w_n)_{t,m} \end{vmatrix},$$

m represents that a number of pixels in each frame is m, t represents that a number of sample points in the dictionary D is t, $(w_i)_{q,p}$ represents the reconstruction coefficient of the $p^{th}$ pixel in the $i^{th}$ frame corresponding to the $q^{th}$ sample point in the dictionary.

2. The method according to claim 1, wherein, the determining the known pixels and the unknown pixels in the input video, specifically comprises:

determining the known pixels and the unknown pixels in the input video by using a pen-based interaction marking;

or determining the known pixels and the unknown pixels in the input video according to a trimap of the input video.

3. The method according to claim 1, wherein, the setting the opacity α values of the known pixels, specifically comprises:

setting α values of known foreground pixels as 1, and setting α values of known background pixels as 0.

4. The method according to claim 1, wherein, the training the dictionary according to the known pixels in the keyframes, specifically comprises:

training the dictionary by minimizing following energy equation (1):

$$\operatorname*{argmin}_{(D,Z)} \sum_{i,j} \left( \|\hat{X} - DZ\|_F^2 + \|\hat{X}_i - D_i Z_i\|_F^2 + \sum_{j \neq i} \|D_j Z_i^j\|_F^2 \right) \quad (1)$$

wherein, $\hat{X}=\{\hat{X}_f, \hat{X}_b\}$ represents the known pixels in the keyframes; $\hat{X}_f$ and $\hat{X}_b$ represent the known foreground pixels and background pixels in the keyframes respectively; $D=\{D_f, D_b\}$ represents the trained dictionary, $D_f$ and $D_b$ represent the foreground dictionary and the background dictionary respectively; $Z_f=\{Z_f^f, Z_f^b\}$ represents a reconstruction coefficient of the foreground pixel $\hat{X}_f$ corresponding to the dictionary D, $Z_b=\{X_b^f, Z_b^b\}$ represents a reconstruction coefficient of the background pixel $\hat{X}_b$ corresponding to the dictionary D, and $\{Z_i^j | i,j=f,b\}$ represents a reconstruction coefficient of a known point $\hat{X}_i$ corresponding to the dictionary $D_j$.

5. The method according to claim 1, wherein, the setting the non-local relationship matrix between each pixel in the input video according to the reconstruction coefficient, specifically comprises:

setting the non-local relationship matrix according formula (3):

$$\min \sum_i^n \sum_j^m (\alpha_{ij} - \alpha_D w_{ij})^2 \quad (3)$$

wherein, $\alpha_{ij}$ represents the α value of the $j^{th}$ pixel in $i^{th}$ frame, m represents the number of pixels in each frame is m, $\alpha_D=\{\alpha_f, \alpha_b\}$ represents α values of all sample points in the dictionary D, $\alpha_f=1$ represents α values of sample points in the foreground dictionary, $\alpha_b=0$ represents α values of sample points in the background dictionary, $w_{ij}=[(w_i)_{1,j}, \ldots, (w_i)_{t,j}]$ represents the reconstruction coefficient of the $j^{th}$ pixel in the $i^{th}$ frame corresponding to the dictionary D.

6. The method according to claim 1, wherein, the setting Laplace matrix between multiple frames, specifically comprises:

setting a Laplace matrix between multiple frames according formula (4):

$$W_{ij}^{mlap} = \delta \sum_k^{(i,j) \in c_k} \frac{1 + (C_i - \mu_k)\left(\sum_k + \frac{\delta}{d \times m^2} I\right)^{-1} (C_j - \mu_k)}{d \times m^2}. \quad (4)$$

wherein, $W_{ij}^{mlap}$ represents a Laplace matrix, δ controls intensity of local smoothness, k represents a number of the windows in one frame, $c_k$ represents the $k^{th}$ window, $C_i$ represents a color value of the $i^{th}$ pixel, $\mu_k$ and $\Sigma_k$ represent mean and variance of the color in the window respectively, ò represents a normal coefficient, $d \times m^2$ is a size of the window which represents selecting neighboring d frames and each frame selects pixels in $m^2$ window as neighbors, and I represents an identity matrix.

7. The method according to claim 6, wherein the normal coefficient ò is set as $10^{-5}$, m as 3, and d as 2.

8. The method according to claim 6, wherein, the obtaining the video alpha matte of the input video, according to α values of the known pixels of the input video and α values of sample points in the dictionary, the non-local relationship matrix and the Laplace matrix, specifically comprises:

obtaining α values of the unknown pixels of the input video according formula (5):

$$E = \lambda \sum_{s \in S} (\alpha_s - g_s)^2 + \sum_{i=1}^{n} \sum_{j=1}^{m} (\alpha_{ij} - \alpha_D w_{ij})^2 + \sum_{i=1}^{n} \sum_{j=1}^{m} \left( \sum_{(k \in N_j)} W_{jt}^{mlap} (\alpha_{ij} - \alpha_k) \right)^2 \quad (5)$$

wherein, E represents an energy equation, S represents a set constructed by α values of the known pixels of the input video and α values of sample points in the dictionary, wherein the α values is obtained by minimizing the energy equation E, $N_j$ is adjacent points of pixel j in d×m² window, $g_s$=1 represents pixel s in set S is a foreground pixel, and $g_s$=0 represents pixel s in set S is a background pixel; and obtaining the video alpha matte of the input video according to α values of the known pixels and α values of the unknown pixels of the input video.

* * * * *